United States Patent [19]

Fuelberth et al.

[11] Patent Number: 4,916,973
[45] Date of Patent: Apr. 17, 1990

[54] TORQUE BIASED DIFFERENTIAL MECHANISM

[75] Inventors: Walter K. Fuelberth, Warren; Andrew Fedor, Jr., Livonia, both of Mich.

[73] Assignee: General Motors Corporation, Detroit, Mich.

[21] Appl. No.: 196,444

[22] Filed: May 20, 1988

[51] Int. Cl.⁴ .................. F16H 47/04; F16H 47/08
[52] U.S. Cl. ............................. 475/53; 475/89
[58] Field of Search ............... 74/677, 688, 710, 711, 74/710.5, 714, 705, 682, 687; 180/249, 250

[56] References Cited

U.S. PATENT DOCUMENTS

| | | | |
|---|---|---|---|
| 3,915,031 | 10/1975 | Hanson | 74/714 |
| 4,008,628 | 2/1977 | Orshansky, Jr. | 74/687 |
| 4,272,993 | 6/1981 | Kopich | 74/711 |
| 4,373,604 | 2/1983 | Lunn et al. | 180/247 |
| 4,493,227 | 1/1985 | Schmid | 74/711 |
| 4,574,656 | 3/1986 | McCarthy et al. | 74/711 |
| 4,691,593 | 9/1987 | Mueller | 74/714 |
| 4,712,448 | 12/1987 | Lanzer | 74/710.5 |

FOREIGN PATENT DOCUMENTS

| | | | |
|---|---|---|---|
| 0017098 | 10/1980 | European Pat. Off. | 74/711 |
| WO87/06668 | 11/1987 | PCT Int'l Appl. | 74/710.5 |
| WO87/07348 | 12/1987 | PCT Int'l Appl. | 74/711 |
| 1172759 | 8/1985 | U.S.S.R. | 74/711 |

Primary Examiner—Leslie A. Braun
Assistant Examiner—Harold F. Macris
Attorney, Agent, or Firm—Francis J. Fodale

[57] ABSTRACT

A four wheel drive vehicle has a torque biased interaxle differential comprising a fluid coupling which is driven by a planetary gear set which multiplies the speed difference between the outputs of the differential.

1 Claim, 3 Drawing Sheets

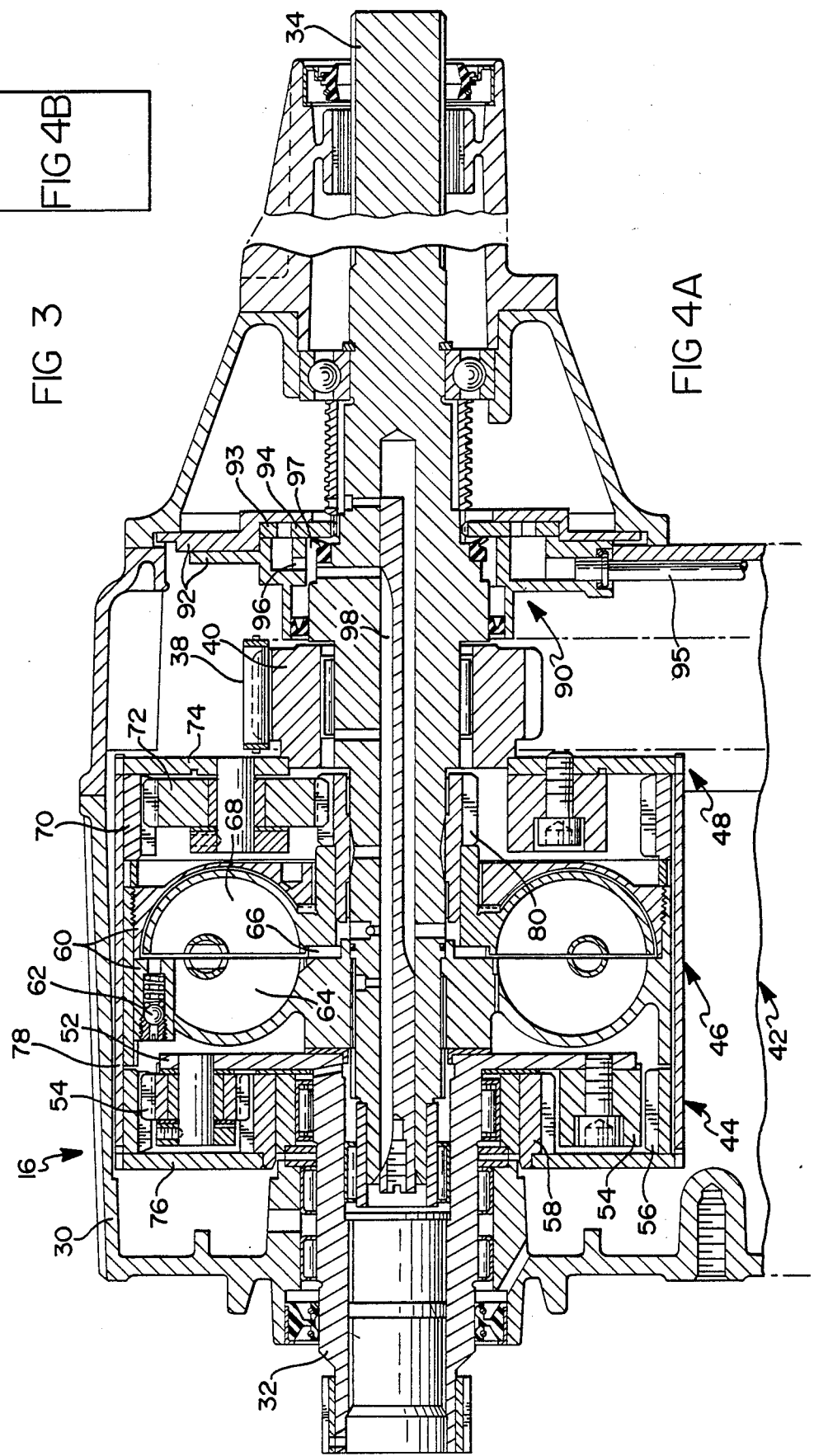

TORQUE BIASED DIFFERENTIAL MECHANISM

BACKGROUND OF THE INVENTION

This invention relates generally to differential mechanisms and more specifically to torque biased differential mechanisms which are used in four wheel drive vehicles.

The drive train for four wheel drive vehicles commonly include an auxiliary transmission or transfer case which has a drive input which is driven by the main transmission and front and rear drive outputs for driving the front and rear drive axles respectively. These auxiliary transmissions or transfer cases may include a differential mechanism, commonly referred to as an inter-axle differential, to accommodate the differences in front and rear wheel speeds, particularly in cornering maneuvers.

Inter-axle differentials which split the torque evenly, or at some fixed ratio, between the front and rear outputs are known as "open" differentials. A known drawback of these "open" differentials is that the vehicle wheels will not produce enough tractive force to drive the vehicle if any one of the four wheels is on a slippery surface. Consequently, inter-axle differentials are often of torque biased type which insure that a useful amount of the input torque is directed to the drive output for the wheels which can produce sufficient traction.

Known torque biasing devices include manually applied positive (dog) clutches, friction plate or cone clutches which are either spring or hydraulically loaded, speed responsive locking clutches, viscous clutches or couplings and fluid couplings all of which couple the two outputs of the differential mechanism in one way or another.

Of these known torque biasing devices, the fluid coupling has several very desirable operating characteristics because it produces a variable torque bias which is proportional to the square of the speed difference between the two outputs of the differential mechanism. On the other hand, the variable torque produced by the fluid coupling is also directly proportional to the diameter of the fluid coupling and thus the use of the fluid coupling as a torque biasing device is not feasible for automotive applications because of the space requirements. This is particularly so in the case of inter-axle differentials for four wheel drive passenger type vehicles.

SUMMARY OF THE INVENTION

The object of this invention is to provide an improved torque biased differential having a fluid coupling for a torque biasing device which is compact.

Another object of this invention is to provide an improved torque biased differential having a fluid coupling for a torque biasing device which is responsive to a multiplication of the speed differences between the two outputs of the differential so that a fluid coupling of smaller diameter may be used.

Another object of this invention is to provide an improved torque biased differential having a fluid coupling for a torque biasing device and a speed multiplying device for increasing the effect of the speed differences between the two outputs of the differential upon the fluid coupling.

A feature of the invention is that the torque splitting differential may take the form of a planetary differential and thus the torque biased differential mechanism may be designed for an uneven front-to-rear torque split.

Another feature of the invention is that the speed multiplying device may also take the form of a planetary differential and thus the improved torque biasing differential is compact in length as well as diameter.

Another feature of the invention is that the fluid coupling is disposed between the first torque splitting planetary differential and the second speed multiplying planetary differential for effective space utilization.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

BRIEF DESCRIPTION OF THE DRAWINGS

FIG. 3 is a diagram showing the juxtaposed relationship of FIGS. 4A and 4B which provide a longitudinal section of the transfer case which is shown in FIGS. 1 and 2.

FIG. 4A is a fragmentary longitudinal sectional view of the transfer case which is shown in FIGS. 1 and 2.

DETAILED DESCRIPTION OF THE PREFERRED EMBODIMENT

Figures 1, 2:
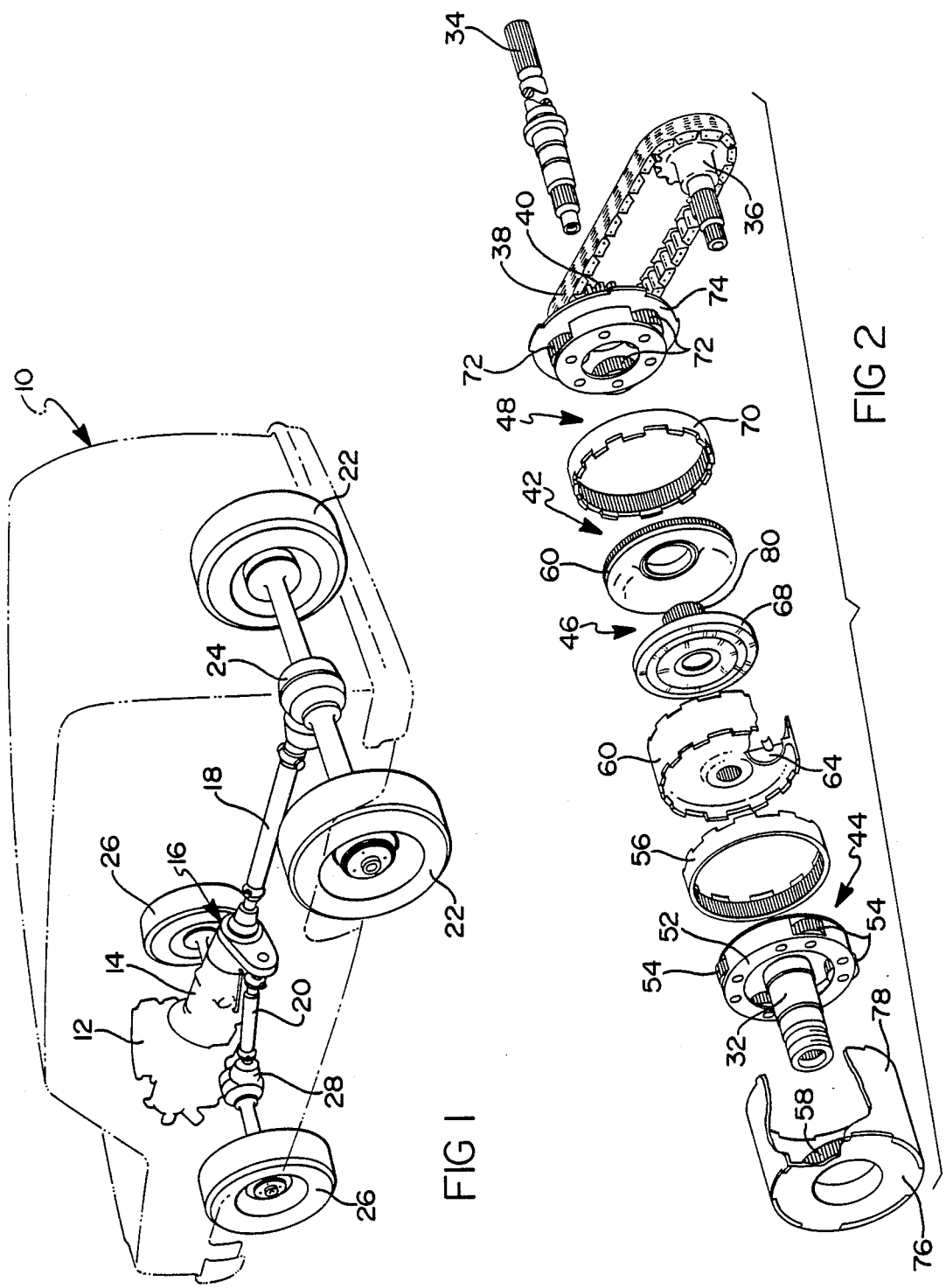
FIG. 1 is a perspective view of a four wheel drive vehicle having a drive train which includes an auxiliary transmission or transfer case having a torque biased differential mechanism in accordance with this invention.
FIG. 2 is an exploded perspective view of the internal parts of the transfer case which is shown in FIG. 1.

Referring now to the drawing and particularly to FIG. 1, the four wheel drive vehicle 10 has a drive train which comprises an internal combustion engine 12, a main transmission 14 and an auxiliary transmission or transfer case 16. The transfer case 16 splits the drive, which it receives from the engine 12 via the main transmission 14, between a rear propeller shaft 18 and a front propeller shaft 20.

The rear propeller shaft 18 drives the rear wheels 22 by way of a final drive 24 comprising a rear differential and drive axle while the front propeller shaft 20 drives the front wheels 26 by way of a front final drive 28 comprising a front differential, and front drive axle.

Figure 4B:
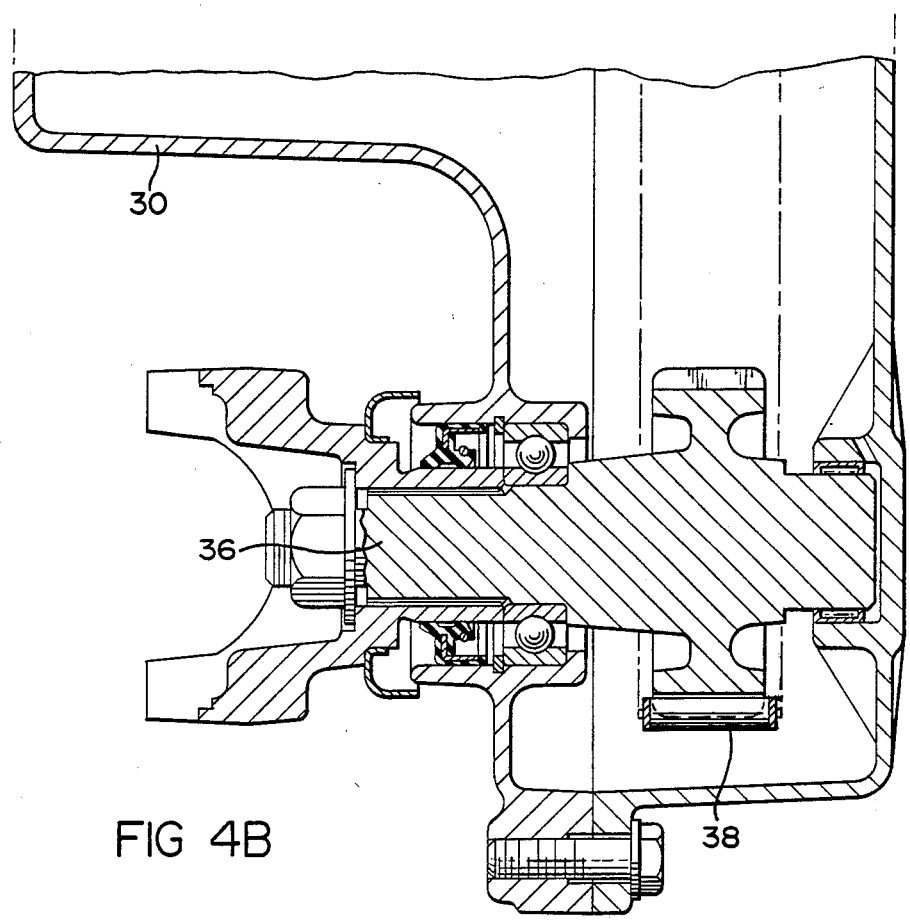
FIG. 4B is a fragmentary longitudinal sectional view of the transfer case which is shown in FIGS. 1 and 2.

The transfer case 16, which is shown in detail in FIGS. 2 and 4, comprises a housing 30 having a concentrically arranged input shaft 32 and first output shaft 34 which rotate relative to the housing 30 and to each other. The transfer case 16 also includes a second offset output shaft 36 which rotates on an axis which is parallel to and spaced from the coincidental rotational axes of the input shaft 32 and the first output shaft 34. The second output shaft 36 is connected by a drive chain 38 to a drive sprocket 40 which is journalled on the first output shaft 34.

The input shaft 32 of the transfer case 16 is drive connected to the output shaft (not shown) of the main transmission 14. The concentrically arranged first output shaft 34 is drive connected to the rear propeller shaft 18 for driving the rear wheels 22 while the offset second output shaft 36 is drive connected to the front propeller shaft 20 for driving the front wheels 26.

The transfer case 16 also includes a torque biased differential mechanism which is indicated generally at 42 in FIGS. 2 and 4.

The torque biased differential mechanism 42 comprises a first differential 44 for splitting the torque received by the input shaft 32 of the transfer case 16 between the first and second output shafts 34 and 36; a hydrodynamic fluid coupling 46 for biasing the torque of the first and second output shafts 34 and 36 in response to the speed difference between the first and second output shafts 34 and 36; and a second gear set 48 for multiplying the speed difference between the first and second output shafts 34 and 36 which is applied to the hydrodynamic fluid coupling 46.

The first differential 44 is a planetary differential which comprises a planetary carrier 52 which is integrally connected to the input shaft 32 and which carries planetary pinion gears 54. The planetary pinion gears 54 engage an outer ring gear 56 which is drive connected to the first output shaft 34 and a sun gear 58 which is drive connected to the second output shaft 36 via the drive sprocket 40 which is journalled on the output shaft 34. The planetary pinion gears 54 split the torque received by the input shaft 32 between the first and second output shafts 34 and 36 in proportion to the number of teeth on each gear. In the particular planetary gear set illustrated, the planetary pinion gears 54 have 14 teeth, the sun gear 48 has 46 teeth and the outer ring gear 46 has 74 teeth so that 61.7% of the torque is delivered to the rear wheels 22 while the remaining 38.3% of the torque goes to the front wheels 26 under normal driving conditions when the output shafts 34 and 36 are rotating at the same speed.

The hydrodynamic fluid coupling 46, which biases the torque of the first and second output shafts 34 and 36 in response to a speed difference between the first and second output shafts 34 and 36, comprises a two-piece housing 60 which is non-rotatably secured to the first output shaft 34 by splines and drive connected to the outer ring gear 56 at its outer periphery by cooperating interengaging lugs. The housing 60 has a centrifugal exhaust valve 62, a first vane rotor 64, and an inlet 66. The hydrodynamic fluid coupling further comprises a second vaned rotor 68 which is journalled on the first output shaft 34 and disposed in the housing 60 for rotation relative to the first vaned rotor 64 and the first output shaft 34.

The housing 60 is filled with hydraulic fluid which is maintained under pressure by a generator type pump 90 having a two piece housing 92 which holds an outer rotor 93 and an inner rotor 94, which is splined to the output shaft 34. The suction side of the pump is connected to the oil sump for the transfer case 16 by the oil pipe 95. The pressure side of the pump 90 delivers the oil under pressure to the fluid coupling 46 via housing outlet 96, manifold 97 and passage 98 in the output shaft 34 leading from the manifold 97 to the inlet 66 of the housing 60 for the fluid coupling 46.

The housing 60 and first integrated vaned rotor 64 of the hydrodynamic fluid coupling 46 is direct drive connected to the outer ring gear 56 of the first torque splitting differential with a 1:1 drive ratio. The second vaned rotor 68 is drive connected to the second gear set 48 which multiplies the speed difference between the first and second output shafts 34 and 36.

The second gear set 48, which is a planetary gear set, has two inputs and one output which are arranged to provide a speed multiplying device for the vaned rotor 68 of the fluid coupling 46. The first input of the second planetary gear set 48 is an outer ring gear 70 which is drive connected to the housing 60 by cooperating interengaging lugs at the outer periphery of the housing 60. The outer ring gear 70 of the second planetary gear set 48 is thus direct drive connected to the outer ring gear 56 of the first planetary differential 44 via the housing 60 in a 1:1 drive ratio.

The second input of the second gear set 48 is in the form of planetary pinion gears 72 which are journalled on a planetary carrier 74 which is secured to the drive sprocket 40 and drive connected to the sun gear 58 of the first differential 44. This drive connection between the the sun gear 58 and the planetary carrier 74 is accomplished by a drive plate 76 which is secured to the sun gear 58 and a drive tube 78 which surrounds the housing 60 of the fluid coupling 46. The drive tube 78 is drive connected to the outer peripheries of the drive plate 76 and the planetary carrier 74 by cooperating interengaging lugs.

The output of the second planetary gear set 48 is a sun gear 80 which is journalled on the first output shaft 34 and which is drive connected to the second vaned rotor 68 of the hydrodynamic fluid coupling 46 by splines.

The planetary pinion gears 72 engage the ring gear 70 and the sun gear 80 to drive the sun gear 80 at a speed which is at least as great as the speed of the ring gear 70. When the speeds of the first and second output shafts 34 and 36 of the torque splitting differential 44 are equal, the speeds of the ring gear 70 and the carrier 74 of the planetary differential 48 are also equal and consequently the first and second rotors 64 and 68 of the fluid coupling 46 are driven at the same speed.

However, when the speeds of the first and second output shafts 34 and 36 of the torque splitting planetary differential 44 are different, the speed difference between the first and second output shafts 34 and 36 is multiplied by the second planetary gear set 48 so that the speed difference between the vaned rotors 64 and 68 of the fluid coupling 46 is considerably greater than the speed difference between the output shafts 34 and 36.

In this instance the speed of the vaned rotor 64 is always the same as that of the first output shaft 34 and the ring gear 70. However the speed of the vaned rotor 68 is a function of both the first and second output shafts 34 and 36. This speed is determined by the speed difference between the first and second output shafts 34 and 36 and number of teeth in each of the gears in the speed multiplying planetary gear differential. For example, if ring gear 70 has 74 teeth, the planetary pinion gears 72 have 26 teeth and sun gear 80 has 22 teeth, then the speed multiplying planetary gear differential 48 has a speed ratio of 4.36:1 and the speed of the second vaned rotor 68 will exceed or lag the speed of the first vaned rotor 64 by an amount which is 4.36 times greater than the speed difference between the first and second output shafts 34 and 36.

The hydrodynamic fluid coupling 46 transmits a torque which is proportional to the square of the speed difference between the first and second varied rotors 64 and 68. Consequently the speed multiplying planetary differential 48 increases the effectiveness of the hydrodynamic fluid coupling 46 by a factor of about 19.

The increased effectiveness of the hydrodynamic fluid coupling 46 due to the speed multiplying planetary gear set 48 permits a reduction in the diameter of the hydrodynamic fluid coupling which results in the compact assembly which is illustrated in the drawings. It should also be noted that the hydrodynamic fluid coupling 46 in the differential mechanism 42 includes a centrifugal exhaust valve 62 for the fluid filled housing 60 which opens above a predetermined speed of the first output shaft 34 to eliminate the torque bias effect of the hydrodynamic fluid coupling 46 above the predetermined speed.

We wish it to be understood that we do not desire to be limited to the exact details of construction shown and described, for obvious modifications will occur to a person skilled in the art.

We claim:

1. A torque biased differential mechanism comprising:
   a first planetary gear differential, for splitting torque, having a planetary carrier input, a first outer ring gear output, and a second sun gear output;
   a hydrodynamic fluid coupling, for biasing the torque of the first and second outputs of first differential in response to the speed difference between the first and second outputs of the first differential, having a first rotor which is drivingly connected to the first outer ring gear output of the first differential and a second rotor; and
   a second planetary gear set, for multiplying the speed difference between the first and second outputs of the first differential, having a first outer ring gear input which is drivingly connected to the first outer ring gear output of the first differential, a second planetary carrier input which is drivingly connected to the second sun gear output of the first differential, and a sun gear output which is drivingly connected to the second rotor of the hydrodynamic fluid coupling.

* * * * *